A. ROSENBERGER.
APPARATUS FOR PRODUCING VEGETABLE EXTRACTS.
APPLICATION FILED JUNE 21, 1911.
1,028,282.
Patented June 4, 1912.
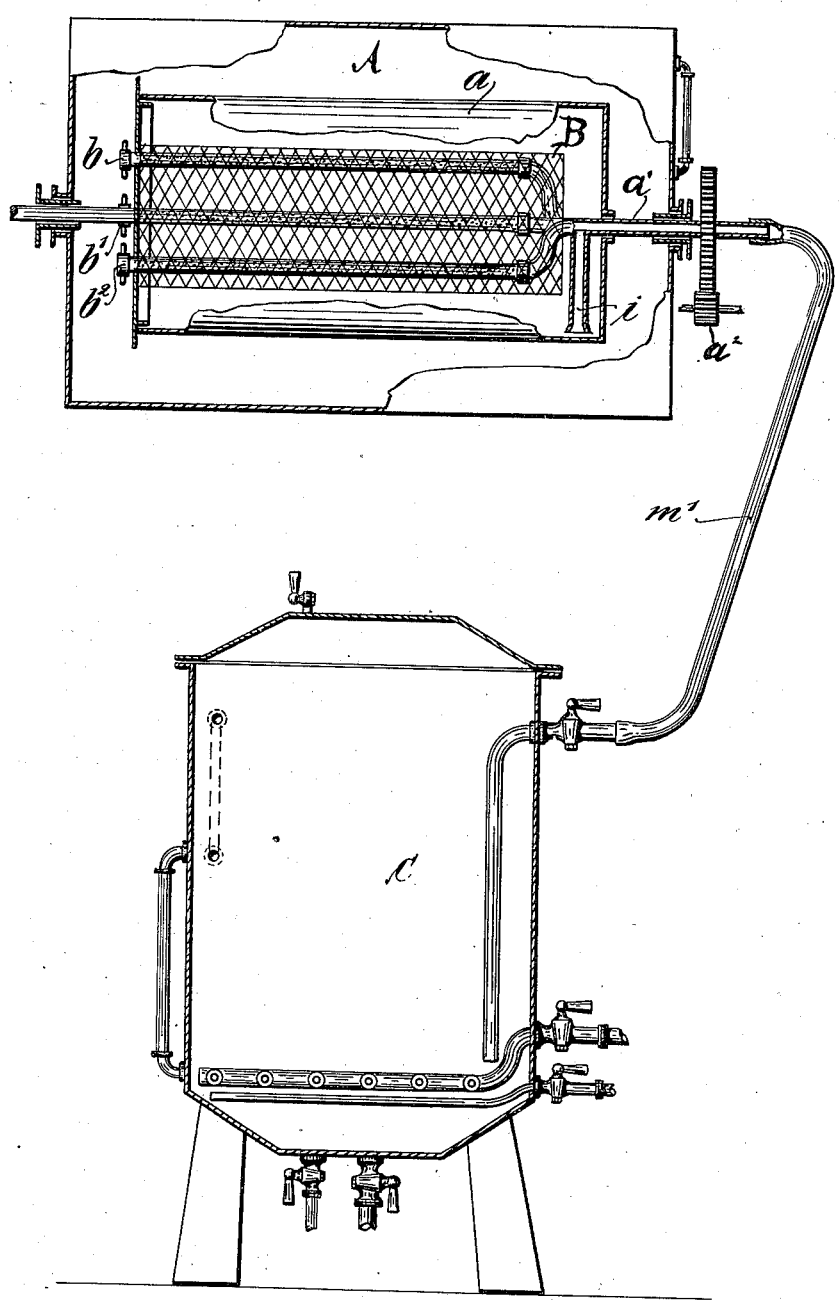

UNITED STATES PATENT OFFICE.

ARTHUR ROSENBERGER, OF BERLIN, GERMANY, ASSIGNOR TO ARTHUR HOROWITZ, OF BERLIN, GERMANY.

APPARATUS FOR PRODUCING VEGETABLE EXTRACTS.

1,028,282.      Specification of Letters Patent.      Patented June 4, 1912.

Application filed June 21, 1911. Serial No. 634,577.

*To all whom it may concern:*

Be it known that I, ARTHUR ROSENBERGER, a subject of the German Emperor, resident of Berlin, Germany, have invented certain new and useful Improvements in Apparatus for Producing Vegetable Extracts, of which the following is a specification.

According to the U. S. Patent No. 957104, an apparatus is protected by which kefir grains are brought into contact with the milk during fermentation by being introduced into thin perforated tubes which are situated in a rotating reservoir which can be adjusted to any temperature from outside by means of water, steam, etc., so that an uninterrupted and regular washing of the kefir grains with the milk is guaranteed. This process and the apparatus can also be employed in order to extract small quantities of drugs, etc., by means of spirit, water or other extraction mediums.

The object of the present invention is to provide an apparatus, by means of which it is possible to make extracts also of larger quantities or mixtures of vegetables in the same manner, without subjecting them to any harmful influence through too high a temperature or the effects of the air.

With the foregoing and other objects in view, the invention consists in the construction, combination and arrangement of parts to be hereinafter more fully described and claimed, and as shown by the appended drawing, in which the figure represents a vertical sectional view of the preferred form of the apparatus; appropriate reference characters identifying the several elements thereof with the following description.

In a reservoir A which can be filled with water, steam, gases or other similar substances and which thereby serves as a heating-reservoir, is situated a rotatory drum $a$, the axis $a$ of which is connected in a suitable manner outside the heating reservoir with a driving wheel $a^2$. On one side the axis is hollow and proceeds outside by a suitable connection $m^1$ to a vacuum boiler $c$, and inside to an elbow $i$ the mouth of which is immediately over the bottom of the drum. In the drum are situated three perforated pipes as in the apparatus of U. S. Patent No. 957104. According to the specification submitted the pipes are inclosed in a case B, the walls of which are perforated in the form of a sieve, or which consist of wire gauze of any desired size of mesh, and which also partakes of the rotation of the drum. This case is provided in a suitable place with an opening which can be closed.

The process for making extracts of vegetables is as follows: The sieve-formed reservoir is filled with the required quantity of the vegetables, as for example digitalis leaves, strophantus seeds, hydrastis roots, ergot, etc., in appropriately pulverized condition, and if necessary they are moistened with alcohol. If extracts are to be made of mixtures of vegetables one part can be placed in the thin tubes $b$, $b^1$, $b^2$, which is especially of great advantage if the quantities of the vegetables to be extracted are different, as then a complete extraction of this small quantity can also with certainty be guaranteed. Then the sieve-formed reservoir is closed and the drum $a$ is about half filled with the extraction medium such as alcohol, water, etc. The heating reservoir A is filled with the heating medium and adjusted to the temperature required and then the drum is made to rotate moderately. Hereby all the vegetables come into regular contact with the extraction medium, which after being thoroughly exhausted can be replaced by fresh as often as necessary. The emptying out of the extraction medium takes place by its being sucked up into the vacuum boiler, where it can be thickened to the desired consistency. Thus it is possible completely to extract drugs of all kinds and especially mixtures of them in the simplest manner and in such a way that during the whole process of extraction and evaporation, they do not come into contact with air and can be subjected to any desired temperature, which remains the same during the entire process of extraction.

What I claim as my invention and desire to secure by Letters Patent is—

1. In an apparatus for producing vegetable extracts, the combination with a casing provided with end walls, of a shaft having bearings in said end walls, a receptacle rigidly mounted on said shaft, a series of perforated tubes extending longitudinally within said receptacle, a cylindrical sieve within the receptacle, said sieve surrounding the tubes, removable closures for said openings, one end of the shaft being hollow and having connection with the series of tubes, a tube leading from said connections, said tube having communication with the interior of the receptacle, and means connected with said hollow shaft for rotating same.

2. In an apparatus for producing vegetable extracts, the combination with a casing of a receptacle rotatably mounted within said casing, a series of perforated tubes within said receptacle, a cylindrical sieve within the receptacle, said sieve surrounding the tubes, a vacuum apparatus in the form of an evaporator located adjacent said receptacle, and means for effecting communication between said vacuum apparatus and the interior of the receptacle.

3. In an apparatus for producing vegetable extracts, the combination with a casing, of a receptacle within said casing, a shaft for said receptacle rotatably mounted in the walls of the casing, one end of said shaft comprising a hollow tube having communication with the interior of the receptacle, a cylindrical sieve within the receptacle, said sieve surrounding the shaft, a vacuum apparatus, said vacuum apparatus provided with suitable evaporating means and having connection with the hollow shaft.

4. In an apparatus for producing vegetable extracts, the combination with a stationary casing, of a receptacle, a series of tubes rigidly carried within the receptacle, a cylindrical sieve within the receptacle, said sieve surrounding the tubes, and means in geared connection with the receptacle for rotating the same.

In testimony whereof I have set my name to this specification in the presence of two subscribing witnesses.

ARTHUR ROSENBERGER.

Witnesses:
 WOLDEMAR HAUPT,
 HENRY HASPER.

---

Copies of this patent may be obtained for five cents each, by addressing the "Commissioner of Patents, Washington, D. C."